(12) United States Patent
Kato et al.

(10) Patent No.: US 6,747,846 B2
(45) Date of Patent: Jun. 8, 2004

(54) THIN FILM MAGNETIC HEAD PREVENTING CORROSION AND THIN FILM MAGNETIC HEAD SLIDER, AND METHODS OF PRODUCING THE SAME

(75) Inventors: Takahiro Kato, Odawara (JP); Noriyuki Saiki, Odawara (JP); Yukihiro Isono, Hadano (JP); Hiroshi Kikuchi, Zushi (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 91 days.

(21) Appl. No.: 10/075,269

(22) Filed: Feb. 15, 2002

(65) Prior Publication Data

US 2003/0206373 A1 Nov. 6, 2003

(30) Foreign Application Priority Data

Aug. 31, 2001 (JP) ........................................ 2001-262653

(51) Int. Cl.⁷ ............................. G11B 5/40; G11B 5/127
(52) U.S. Cl. ..................................... 360/234.5; 360/126
(58) Field of Search .......................... 360/97.02, 97.03, 360/234.3, 234.5, 234.6, 235.1, 235.3, 317, 318, 322, 323, 126, 128, 137

(56) References Cited

U.S. PATENT DOCUMENTS 4,800,454 A * 1/1989 Schwarz et al. ......... 360/234.5
5,335,458 A * 8/1994 Stoffers et al. ................ 451/36
5,465,186 A * 11/1995 Bajorek et al. .............. 360/323
6,266,216 B1 * 7/2001 Hikami et al. ............... 360/317
6,413,388 B1 * 7/2002 Uzoh et al. .............. 204/224 R
2002/0011253 A1 * 1/2002 Puri et al. ....................... 134/1
2003/0133227 A1 * 7/2003 Anan et al. ............... 360/236.3

FOREIGN PATENT DOCUMENTS

JP            1-102710         4/1989
JP       2001-312806 A   * 11/2001

* cited by examiner

Primary Examiner—Jefferson Evans
(74) Attorney, Agent, or Firm—Mattingly, Stanger & Malur, P.C.

(57) ABSTRACT

The present invention forms a conductor that is in electrically conductive contact, through an inside metal layer, with the magnetic thin film of the recording magnetic pole of a thin film magnetic head, and is also exposed to the outside. The equilibrium electrode potential of the conductor in an aqueous solution is set higher than that of the magnetic thin film, and its surface area is larger than the cross-sectional area of the magnetic thin film on the air bearing surface facing the magnetic recording medium. This makes it possible to retard corrosion of the recording magnetic thin film in the process of manufacturing thin film magnetic heads, whereby depletion of the magnetic thin film due to corrosion can be prevented, resulting in improved recording and reproducing qualities.

9 Claims, 7 Drawing Sheets

THIN FILM MAGNETIC HEAD PREVENTING CORROSION AND THIN FILM MAGNETIC HEAD SLIDER, AND METHODS OF PRODUCING THE SAME

BACKGROUND OF THE INVENTION

1. Field of the Invention

The present invention relates to a magnetic head used in a recording and reproducing magnetic element, and more particularly to a thin film magnetic head and a thin film magnetic head slider, and a method of producing the same.

2. Description of the Prior Art

In recent years, magnetic recording/reproducing technology has improved remarkably, and accordingly magnetic recording densities are increasing rapidly year after year. To achieve high density and small size, magnetic disk drive, which is typically a recording and reproducing magnetic element, generally writes data onto a magnetic recording medium by magnetic induction and reads data stored on the medium by a magneto-resistive effect. Two recent trends are for magnetic recording/reproducing systems to use giant magneto-resistive effect type devices to improve magnetic reproduction efficiency, and for recording magnetic elements to use magnetic materials that produce higher magnetic flux densities to offset the decrease in recording magnetic field intensity due to increasingly dense and narrow tracks. In general, however, many of the types of materials used to achieve high density and small size in such devices are highly susceptible to corrosion.

The structure of a typical thin film magnetic head will now be described. The thin film magnetic head has a multilayer cross-sectional structure comprising thin magnetic films and insulating films laminated on a substrate. The magnetic thin films are usually formed by sputtering. The laminated thin films form part of an air bearing surface facing the magnetic recording medium. The air bearing surface section is completed through a lapping step for achieving a higher accuracy in the device height and a washing step for removing residues after lapping. A practical thin-film magnetic head manufacturing process uses an aqueous suspension of diamond abrasive grains and a surfactant agent for lapping, a washing fluid that is a mixture of pure water and a surfactant agent for washing, and pure water for rinsing the washing fluid out. After that, the air bearing surface that will face the magnetic recording medium is coated with an over coat consisting of carbon or other suitable material for higher sliding quality and corrosion resistance. In the subsequent processes, including the completion of the thin film magnetic head sliders and in a thin-film magnetic head assembly process involving bonding of spring suspensions and wiring, the air bearing surface also undergoes washing with a washing fluid that is a mixture of pure water and a surfactant agent and rinsing thereof with pure water, and is then installed in the magnetic disk drive.

During these conventional lapping and washing processes, the metal section including the magnetic thin films on the air bearing surface is exposed to the aqueous solutions. Even after the over coat of air bearing surface is formed, the metal section including the magnetic thin films may be exposed to the aqueous solutions through local defects in the over coat. Protective strength against corrosion has depended on the corrosion resistance of the metal. Since all metals do not have sufficient anticorrosion properties, corrosion may unavoidably occur, depending on the type of a metal selected for use. Such corrosion causes bumps and depressions on the air bearing surface, resulting in degraded magnetic characteristics.

One approach to this problem from the manufacturing side employs a nonpolar hydrocarbon solvent in the lapping and washing fluids instead of using an aqueous solution, but the washing power in particular of such hydrocarbon solvent solutions is known to be considerably lower than that of an aqueous solution. Therefore, water washing is much more effective in achieving a high level of cleanliness of the air bearing surfaces.

A method of suppressing corrosion of the metal thin films that occurs due to the use of such aqueous solutions has been disclosed by JP-A-102710/1989. The method brings another thin film, consisting of a substance having an ionization tendency greater than that of the magnetic thin film, into contact with the recording magnetic thin film section of the magnetic head, and exposes part of this other thin film to the air bearing surface. As a result, the magnetic thin film and the other thin film form a local battery, which causes corrosion to develop from the other thin film, thereby retarding corrosion of the magnetic thin film.

The thin film of the substance having an ionization tendency greater than that of the magnetic thin film, however, must be so formed on the air bearing surface as not to affect the magnetic recording/reproducing qualities; more specifically, it should be formed in such a way that its area is the same as or smaller than that of the exposed area of the recording magnetic thin film on the air bearing surface. It is difficult to provide a thin film consisting of a substance having an ionization tendency greater than that of the magnetic thin film with this small an area on the air bearing surface where the magnetic thin film requiring protection against corrosion is exposed. Therefore, this method cannot provide a sufficient corrosion retarding effect.

In addition, a thin film consisting of a substance having a comparatively great ionization tendency is susceptible to corrosion, so if it is exposed on the air bearing surface, the ensuing corrosion products may become projecting faults, which adversely affects anti-sliding properties with respect to the magnetic recording medium, resulting in poor reliability.

SUMMARY OF THE INVENTION

An object of the present invention is to provide a thin film magnetic head and a thin film magnetic head slider and methods of producing the same that can effectively retard corrosion of the magnetic thin film immersed in aqueous solutions during the lapping and washing stages of the manufacturing process.

The problem addressed by the present invention can be effectively solved by providing a recording magnetic element and an external conductor electrically coupled to the recording magnetic element by a lead wire, the conductor having an equilibrium electrode potential in an aqueous solution higher than that of the recording magnetic element alone, and having a surface area larger than the cross-sectional area of the recording magnetic element on an air bearing surface facing a magnetic recording medium. The conductor is exposed on an outer surface of the thin film magnetic head that will be immersed in the aqueous solution.

Use of this method can provide the conductor area necessary for suppressing metal dissolution from the recording magnetic element on the air bearing surface in the aqueous solution. This is because corrosion of the magnetic thin film can be retarded.

As described above, the conductor should consist of a material with an equilibrium electrode potential in an aqueous solution higher than the equilibrium electrode potential of the magnetic thin film alone. More specifically, the conductor is preferably an elemental metal conductor, an alloy conductor, or a chemical compound conductor including a material selected from a group of metals such as Au, Ag, Pt, Ru, Rh, Pd, Os, and Ir, or a group of conductive ceramics such as $Al_2O_3.TiC$, SiC, TiC, WC, and $B_4C$.

Corrosion retarding mechanisms will now be described. One mechanism in which a conductor consisting of a material such as those described above retards corrosion of a magnetic thin film placing the magnetic thin film in electrically conductive contact with a conductor having an equilibrium electrode potential higher than that of the magnetic thin film, thereby shifting, that is, raising, the equilibrium electrode potential in an aqueous solution (more specifically, a lapping or washing fluid) into passive region, thereby retarding corrosion of the magnetic thin film. It is known that, generally, a stable passive film is formed on the surface of a metal in the passive region and the metal is immune to corrosion at this potential. Accordingly, it is possible to retard corrosion of magnetic thin films, even if they are susceptive to corrosion in aqueous solutions, by shifting the equilibrium electrode potentials into the passive regions.

In another corrosion retarding mechanism, a natural ultra-thin oxide film is formed on the surface of the magnetic thin film through exposure to air before the magnetic thin film is immersed into a washing fluid, or after it is lapped. This natural oxide film is produced in different states depending on the material of the magnetic thin film. A natural oxide film formed on the surface of a magnetic thin film containing Fe or Co as its major constituent is highly susceptible to destruction. In this state, generally, the Fe or Co dissolves rapidly in the washing fluid and the natural oxide film is destroyed in a very short period of time, resulting in corrosion. The present invention brings a conductor into electrically conductive contact with the magnetic thin film to make its equilibrium electrode potential in the aqueous solution closer to that of the magnetic thin film, or raise its equilibrium electrode potential, as described above, whereby the speed at which the metal contained in the magnetic thin film dissolves can be made too slow to yield sufficient energy for destruction of the natural oxide film formed on the surface of the magnetic thin film, washing of the magnetic thin film can be performed by maintaining a state in which the natural oxide film is prevented from destruction, and corrosion of the magnetic thin film can be retarded.

The corrosion retarding mechanisms described above achieve high corrosion retarding effects if the equilibrium electrode potential of the magnetic thin film in the aqueous solution is as close as possible to that of the conductor. For this purpose, it is effective to make the surface area of the conductor as large as possible, so that the combined equilibrium electrode potential in the aqueous solution of the conductor and the magnetic thin film, which are in electrically conductive contact with each other, is governed by the surface area of the conductor, and therefore approaches the equilibrium electrode potential of the conductor alone.

A thin film magnetic head slider according to the present invention has a substrate having an air bearing surface facing a magnetic recording medium, a magneto-resistive effect type reproducing magnetic element comprising a magnetic thin film formed on the substrate, a metal film for electrically connecting the reproducing magnetic element to the outside, a recording magnetic element that generates a magnetic field, a recording coil for carrying electric current, a metal film for electrically connecting the recording coil to the outside, and a conductor formed outside but brought into electrically conductive contact with the recording magnetic element via a lead wire; and the conductor has an equilibrium electrode potential in an aqueous solution higher than that of the recording magnetic element alone and a surface area larger than the cross-sectional area of the recording magnetic element on the air bearing surface facing the magnetic recording medium.

A method of producing a thin film magnetic head slider according to the present invention comprises a step of forming a recording and reproducing magnetic element, including a magneto-resistive effect type reproducing magnetic element formed by a magnetic thin film, a recording magnetic element that generates a magnetic field, and a recording coil for carrying electric current thereto on an insulating film formed on a substrate; a step of coating the recording and reproducing magnetic element with an insulating over coat; a step of forming a metal film for connecting the reproducing magnetic element and the recording coil to the outside via lead wires so that the metal film is exposed on the external surface of the insulating over coat; a step of forming a conductor exposed on the outer surface of the insulating over coat and brought into electrically conductive contact with the recording magnetic element via a lead wire; and a step of lapping and washing the air bearing surface facing the magnetic recording medium after the step of formation of the conductor; the conductor having an equilibrium electrode potential in the aqueous solution higher than that of the recording magnetic element and having a larger surface area than the cross-sectional area of the recording magnetic element on the air bearing surface facing the magnetic recording medium.

Furthermore, magnetic disk drive according to the present invention includes a thin film magnetic head comprising a recording magnetic element constructed with a magnetic thin film and an external conductor that is in electrically conductive contact with the recording magnetic element, the conductor having an equilibrium electrode potential in an aqueous solution higher than that of the recording magnetic element alone, and having a larger surface area than the cross-sectional area of the recording magnetic element on the air bearing surface facing the magnetic recording medium, thereby achieving outstanding recording and reproducing qualities.

DESCRIPTION OF THE PREFERRED EMBODIMENTS

Embodiments of the present invention will now be described with reference to the attached drawings.

The thin film magnetic heads shown in the embodiments are recording and reproducing magnetic elements combining a reproducing magnetic element with a recording magnetic element, and function as thin film magnetic head sliders that fly facing the surface of a magnetic recording medium.

Figure 1:
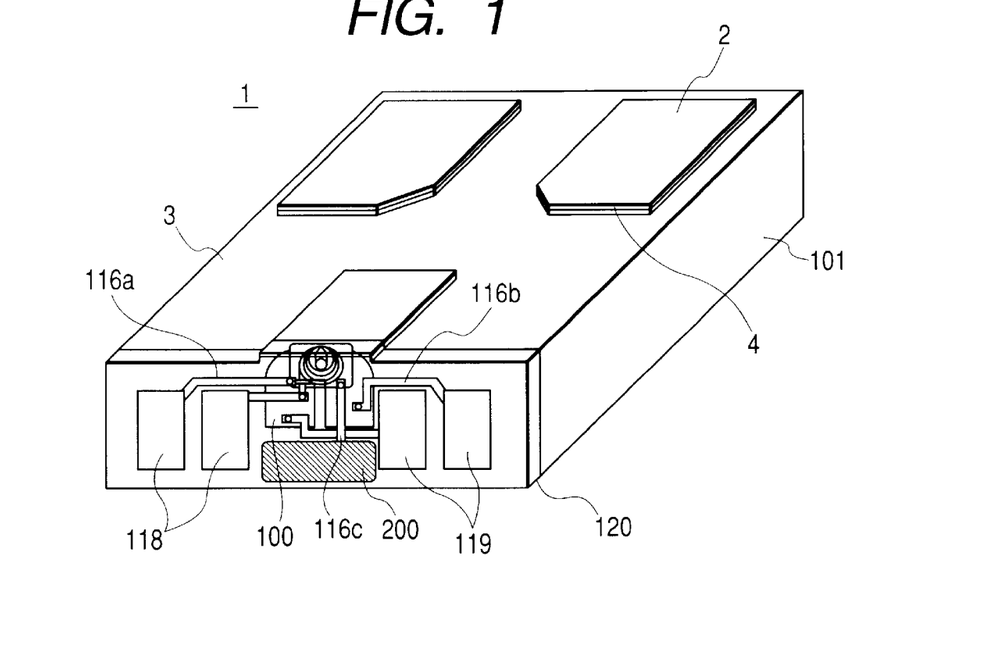
FIG. 1 is a perspective view showing a first embodiment of a thin film magnetic head slider equipped with a thin film magnetic head according to the present invention.

FIG. 1 shows a first embodiment of the present invention which provides a recording and reproducing magnetic element as a thin film magnetic head slider. In FIG. 1, reference numeral 101 indicates a substrate, reference numeral 100 indicates a recording and reproducing magnetic element combining a reproducing magnetic element and a recording magnetic element that are formed on the substrate 101, reference numeral 116c indicates an inside metal layer that forms a lead wire providing electrically conductive contact with the recording magnetic element, reference numeral 200 indicates a conductor formed in electrically conductive contact with the inside metal layer, reference numeral 118 indicates a relay terminal for recording for electrically connecting a coil of the recording magnetic element to the outside, reference numeral 119 indicates a reproducing relay terminal for electrically connecting the reproducing magnetic element to the outside, and reference numeral 120 indicates a thin film magnetic head comprising the components described above. Furthermore, in FIG. 1, reference numeral 2 indicates an air bearing surface rail formed on the surface of the substrate 101 facing a magnetic recording medium (not shown in the drawing), reference numeral 3 indicates an air bearing surface facing the magnetic recording medium on the air bearing surface rail 2, and reference numeral 1 indicates a thin film magnetic head slider comprising the thin film magnetic head 120, the air bearing surface rail 2, and the air bearing surface 3. The conductor 200 is formed as a thin film magnetic head slider 1 by being exposed on the same surface on which the relay terminal for recording 118 and the reproducing relay terminal 119 are provided.

Subsequently, this embodiment will be described in more detail as the manufacturing process of the thin film magnetic head slider 1 is explained with reference to FIGS. 2 to 9.

Figure 2:
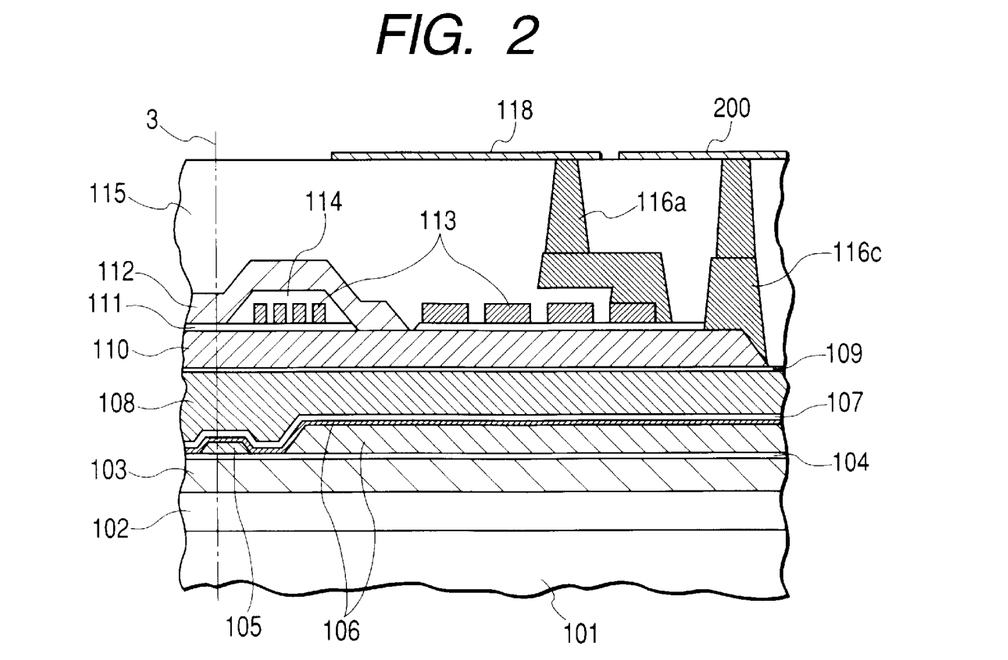
FIG. 2 is a cross-sectional view of the thin film magnetic head of the first embodiment.

FIG. 2 shows a cross sectional view of the thin film magnetic head slider 1 after the completion of the thin film device formation process. The manufacturing process involves first forming a lower insulating layer 102 consisting of alumina or another applicable material on the ceramic substrate 101, next, forming a lower shield layer 103 and a lower gap layer 104 consisting of alumina or another applicable material, then the reproducing magnetic element, a magneto-resistive effect composite layer element (referred to as a magneto-resistive element below) 105 and a pair of electrodes 106 for deriving magnetic signals from the MR element 105.

Subsequently, an upper gap layer 107 consisting of alumina or another applicable material and an upper shield layer 108 are formed. Furthermore, an intermediate insulating layer 109 consisting of alumina or another applicable material, a lower magnetic pole 110 of the recording element, a magnetic gap layer 111 consisting of alumina or another applicable material, and an upper magnetic pole 112 of the recording element are formed. Then a coil 113 for passing electric current to the upper magnetic pole for generating a magnetic field and an organic insulating layer 114 are formed.

Furthermore, a lead-out wire for reproducing 116b (not shown in FIG. 2) drawn from the pair of electrodes 106 having junction with the MR element 105, a lead-out wire for recording 116a drawn from the coil 113, and an inside metal layer 116c drawn through connection from the lower magnetic pole 110. Next, a over coat 115 consisting of alumina or another applicable material for providing electrical protection to a group of such elements is formed to cover the entire processed elements, and finally the reproducing relay terminal 119 (not shown in FIG. 2) for transmitting magnetic signals to the outside and the relay terminal for recording 118 for passing electric current from the outside to the coil 113 are formed. Similarly, the conductor 200 is formed by causing a material selected from a group of metals such as Au, Ag, Pt, Ru, Rh, Pd, Os, and Ir or a group of conductive ceramics such as $Al_2O_3.TiC$, SiC, TiC, WC, and $B_4C$, which yield higher equilibrium electrode potential in an aqueous solution used in the later lapping and washing steps of the air bearing surface than an alloy of Co, Ni, Fe, or other applicable metal that is a part of the component material of the lower magnetic pole 110 and the upper magnetic pole 112, to have electrically conductive contact with the inside metal layer 116c that is extended in electrically conductive contact with the lower magnetic pole 110 to be exposed to the side wall of the thin film magnetic head slider 1 the top of which is the air bearing surface (step 502 in FIG. 9). The area of the conductor 200 is set to be larger than the cross sectional areas of the recording element, or the lower magnetic pole 110 and the upper magnetic pole 112 on the air bearing surface, that is, the cross sectional area of the magnetic thin film on the air bearing surface.

A plurality of the recording and reproducing elements described above are formed on the substrate 101 simultaneously to complete the thin film magnetic head device formation step (step 501 including step 502). In the step described above, the recording and reproducing magnetic element 100 comprises the reproducing magnetic element including the MR element 105 and a pair of electrodes 106 and the recording magnetic element including the lower magnetic pole 110, the magnetic gap layer 111, the coil 113, the organic insulating layer 114, and the upper magnetic pole 112.

Figure 3:
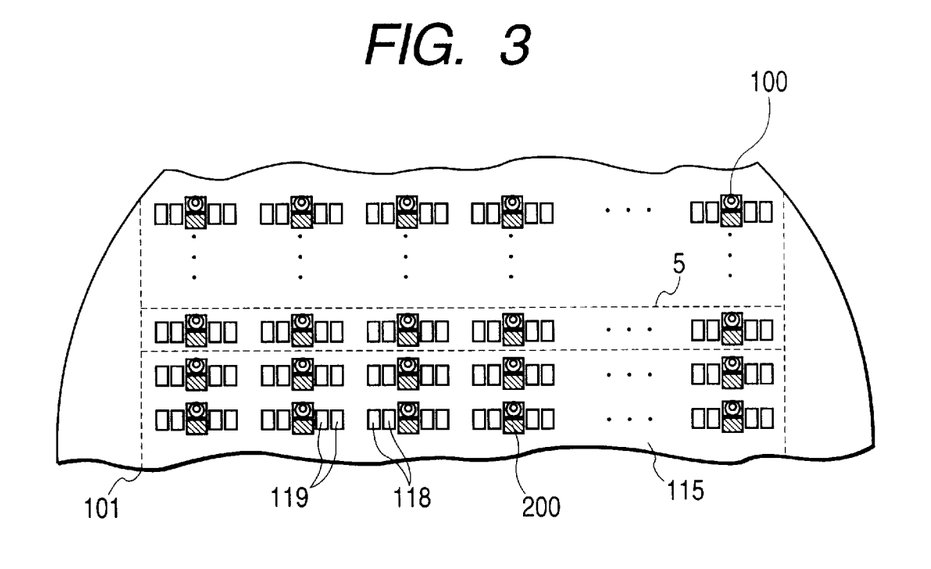
FIG. 3 is a plan view for illustrating a forming process of the thin film magnetic head device according to the present invention.

FIG. 3 is a plan view showing thin film magnetic head devices after the formation process thereof. The substrate 101 has a plurality of arrays of the recording and reproducing magnetic element 100, the conductor 200 formed in continuity with the inside metal layer 116c extended from the lower magnetic pole 110 in electrical continuity with it, the relay terminal for recording 118, and the reproducing relay terminal 119 thereon. The magnetic recording and reproducing elements 100 are hidden inside the over coat 115 and the conductor 200, the relay terminal for recording 118, and the reproducing relay terminal 119 are formed on the surface of the over coat 115.

Next, the substrate 101 is cut along the dotted line 5 by a grinding machine to obtain the rowbar state (step 503).

Figure 4:
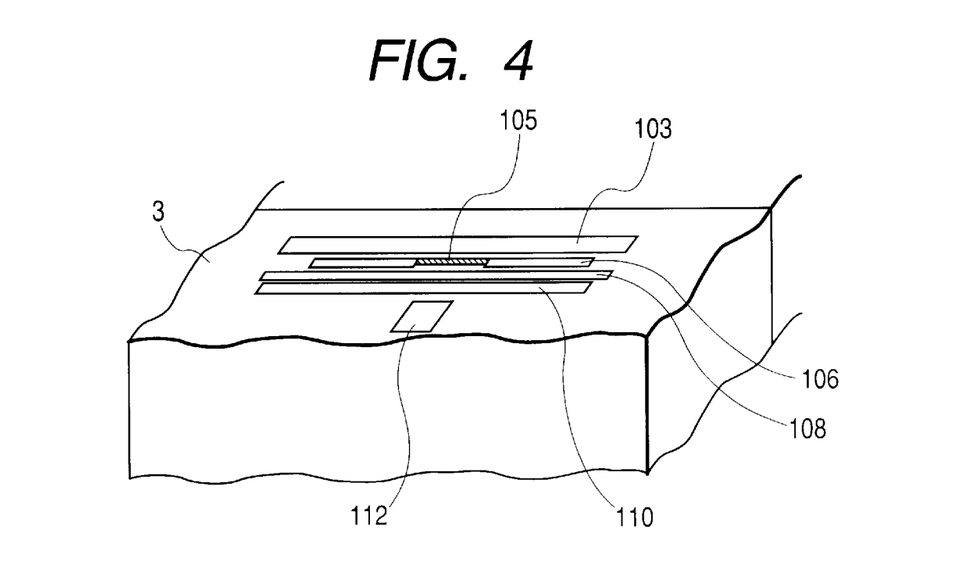
FIG. 4 is a enlarged perspective view for illustrating the air bearing surface section of the thin film magnetic head.

After completion of the forming process described above, the surface cut along the dash-dot line in FIG. 2 is lapped to form the air bearing surface 3 (step 504). FIG. 4 shows the processed air bearing surface 3. The lapping process forms the cross sections of the MR element 105, a pair of electrodes 106, the lower shield layer 103, the upper shield layer 108, the lower magnetic pole 110 and upper magnetic pole 112 of the recording magnetic element on the air bearing surface 3.

Subsequently, washing is carried out (step 505), then a Si groundwork and an inorganic carbon over coat of air bearing surface 4 are formed to improve the anti-sliding properties with respect to a magnetic recording medium, for the subsequent fabrication processes, and for improved corrosion resistance of the thin film element parts on the air bearing surface after the completion of the magnetic head (step 506). Next, the air bearing surface rail 2 is formed to stabilize the minute flying height over the magnetic recording medium (step 507), then a plurality of recording and reproducing magnetic elements 100 are cut one by one by a grinding machine (step 508), and the washing is performed (step 509), the thin film magnetic head slider 1 is completed.

Figure 5:
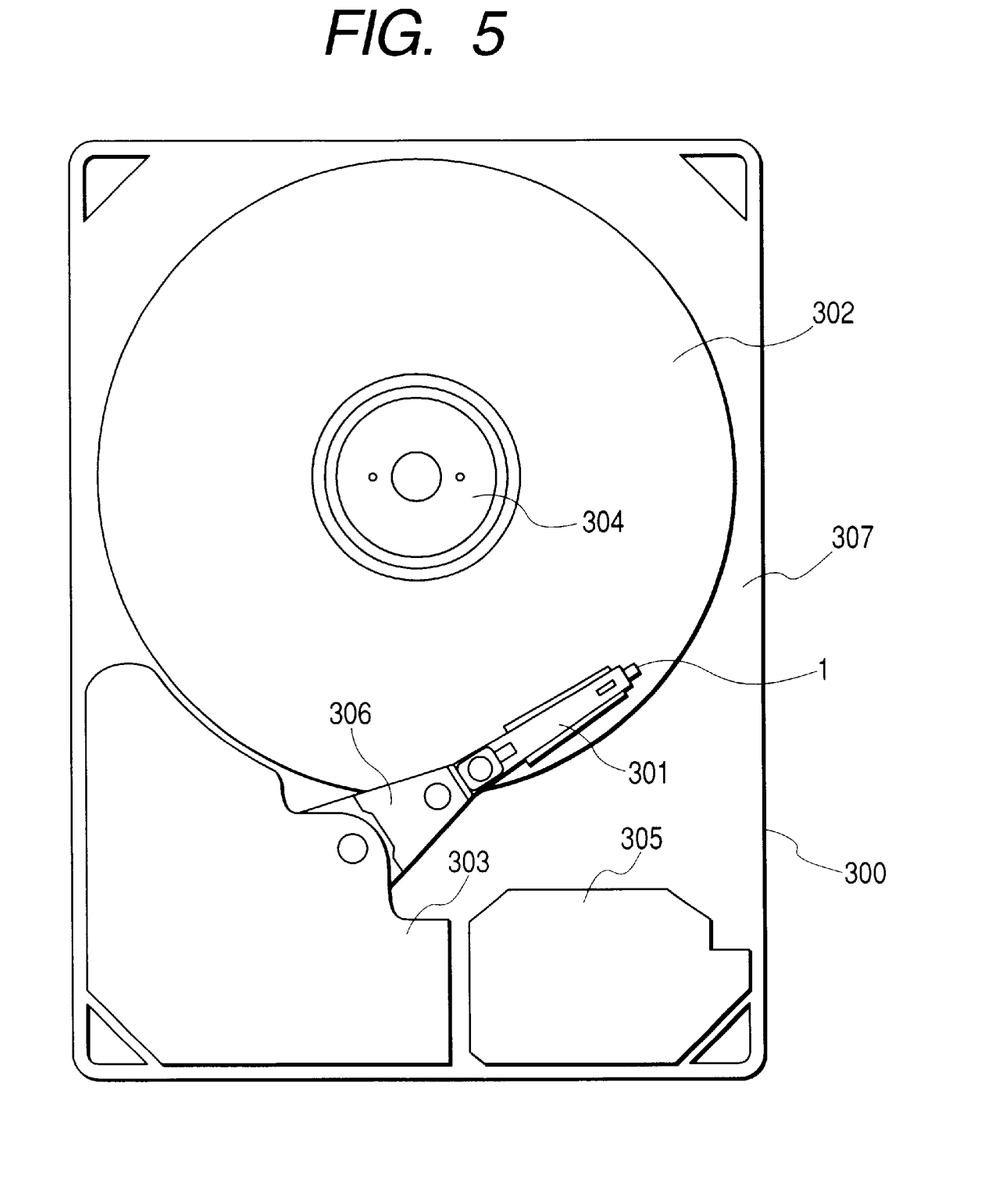
FIG. 5 is a plan schematic diagram for illustrating magnetic disk drive according to the present invention.

After that, the completed thin film magnetic head slider 1 is bonded to a spring suspension arm (not shown in the drawing), the wiring is performed (step 510), then the washing is performed (step 511), a magnetic head assembly 301 shown in FIG. 5 is completed. Finally, the magnetic disk drive shown in FIG. 5 is assembled (step 512).

The structure and operation of magnetic disk drive equipped with the thin film magnetic head assembly 301 described above will now be described with reference to FIG. 5. The magnetic disk drive comprises a magnetic disk 302 that is a disk shaped magnetic recording medium for writing information into the recording region referred to as a track formed concentrically and the thin film magnetic head assembly 301 provided with the thin film magnetic head slider 1 described above, and is constructed by including a rotary actuator that shifts the thin film magnetic head assembly 301 to a given position on the magnetic disk 302, a voice coil motor 303, a read/write amplifier 305 that receives and transmits data to be recorded and reproduced by the thin film magnetic head, and a control means 307 that controls shifting of the rotary actuator 306.

More specifically, a minimum of one rotatable magnetic disk 302 is rotated by a spindle motor 304. A minimum of one thin film magnetic head assembly 301 is installed on the magnetic disk 302. Upon rotating of the magnetic disk 302, the thin film magnetic head assembly 301 shifts across the surface of the disk to access a given position where the target data is stored. The spring suspension arm of the thin film magnetic head assembly 301 has a slight elasticity, bringing the thin film magnetic head slider 1 into intimate contact with the magnetic disk 302.

The voice coil motor 303 comprises a mobile coil placed in a fixed magnetic field and the moving direction and speed of the coil are controlled by electric signals provided from the control means 307.

During operation of the magnetic disk drive 300, the rotary of the magnetic disk 302 produces air bearing caused by an air flow between the thin film magnetic head slider 1 and the surface of the magnetic disk 302, which levitates the thin film magnetic head slider 1 from the surface of the magnetic disk 302 with a given spacing. Therefore, during operation of the magnetic disk 300, this air bearing is kept to be in balance with the slight elasticity of the spring suspension arm, thereby causing the thin film magnetic head slider 1 to keep levitating without coming into contact with the surface of the magnetic disk 302 and with keeping a given distance from the magnetic disk 302.

In general, the control means 307 comprises logic circuits, memory, a microprocessor, and other components. The control means 307 transmits and receives control signals through the applicable signal flow paths to control a variety of components of the magnetic disk drive 300. The spindle motor 304, for example, is controlled by motor driving signals. The rotary actuator 306 is controlled by head-position control signals, seek control signals, and other signals to optimally shift and position the selected thin film magnetic head slider 1 on a target data track of the magnetic disk 302. The control means 307 analyzes the electric signals to which the thin film magnetic head converts the information read from the magnetic disk 302. The control means 307 also transmits electric signals to be written as information onto the magnetic disk 302 to the thin film magnetic head. In other words, the control means 307 controls the receiving and transmitting of information read or written by the thin film magnetic head. The recording and reproducing signals may be transmitted directly from the thin film magnetic head. Control signals includes access control signals and clock signals. Needless to say, the magnetic disk drive 300 may also have a plurality of magnetic disks 302 and rotary actuators 306, and the rotary actuator 306 may have a plurality of thin film magnetic heads.

In the manufacturing process of the thin film magnetic head slider 1 described above, the method of forming the conductor 200 and the inside metal layer 116c uses Cu, for example, as materials of the lead-out wires for recording and reproducing 116a and 116b, and also uses Cu as a material of the inside metal layer 116c. In addition, the method uses Au, for example, as materials of the relay terminal for recording 118 and the reproducing relay terminal 119, and also uses Au as a material of the conductor 200. With this method, the lead-out wire for recording 116a and the lead-out wire for reproducing 116b and the inside metal layer 116c can be formed at the same time, and the relay terminal for recording 118 and the reproducing relay terminal 119 can be formed at the same time. The conductor 200 shown in FIGS. 1 and 3 is rectangular, but the same effect can be produced regardless of the shape. The inside metal layer 116c may be formed by being brought into electrically conductive contact with the upper magnetic pole 112 instead of being drawn from the lower magnetic pole 110. In the thin film magnetic head having the upper shield layer as to double the lower magnetic pole, the same effect can be provided by forming the inside metal layer 116c in continuity with the upper shield layer.

Figure 6:
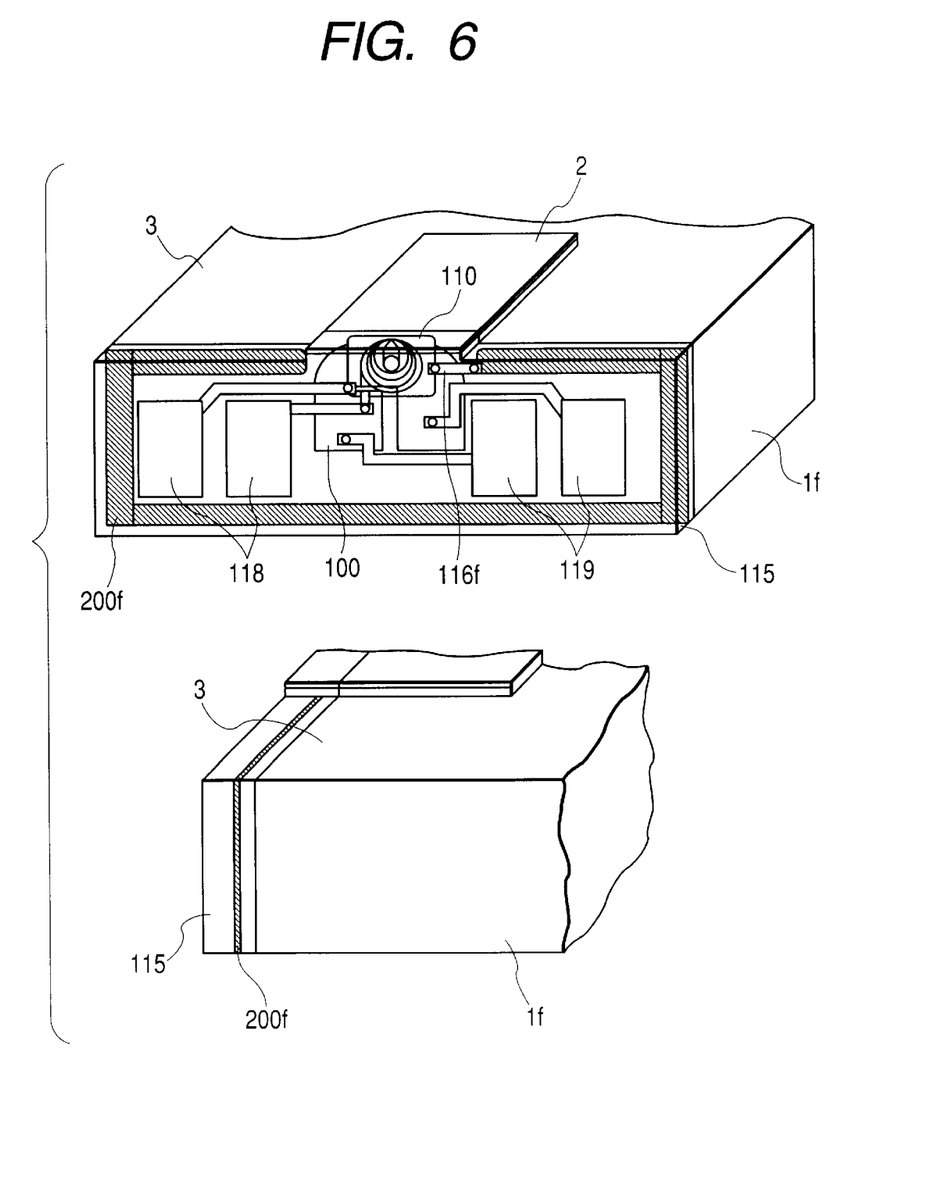
FIG. 6 is a perspective view of showing a second embodiment of a thin film magnetic head slider of the present invention.

Other embodiments will now be described with reference to FIGS. 6, 7, and 8. FIG. 6 shows a thin film magnetic head slider if of a second embodiment wherein a conductor is formed in an over coat instead of being exposed to the surface of the over coat. With reference to FIG. 6, a conductor 200f is connected to the lower magnetic pole 110 through an inside metal layer 116 connected thereto, and positioned so that the cross sections of the conductor 200f are exposed to the air bearing surface 3 except for the air bearing surface rail, the both side wall surfaces, and the bottom surface that will constitute the thin film magnetic head slider if. After that, the over coat 115 is formed so as to cover the formed recording and reproducing magnetic element 100, including the conductor. Such a structure can produce the same effect as in the first embodiment shown in FIG. 1. That is, it presents no problem, even if a conductor is not formed on the same surface on which the recording and reproducing relay terminals are formed, if the conductor can be formed at a position capable of securing a larger conductor area than the cross sectional area of the magnetic thin film on the air bearing surface and so that the conductor is exposed on the outer surface of the thin film magnetic head slider.

Figure 7:
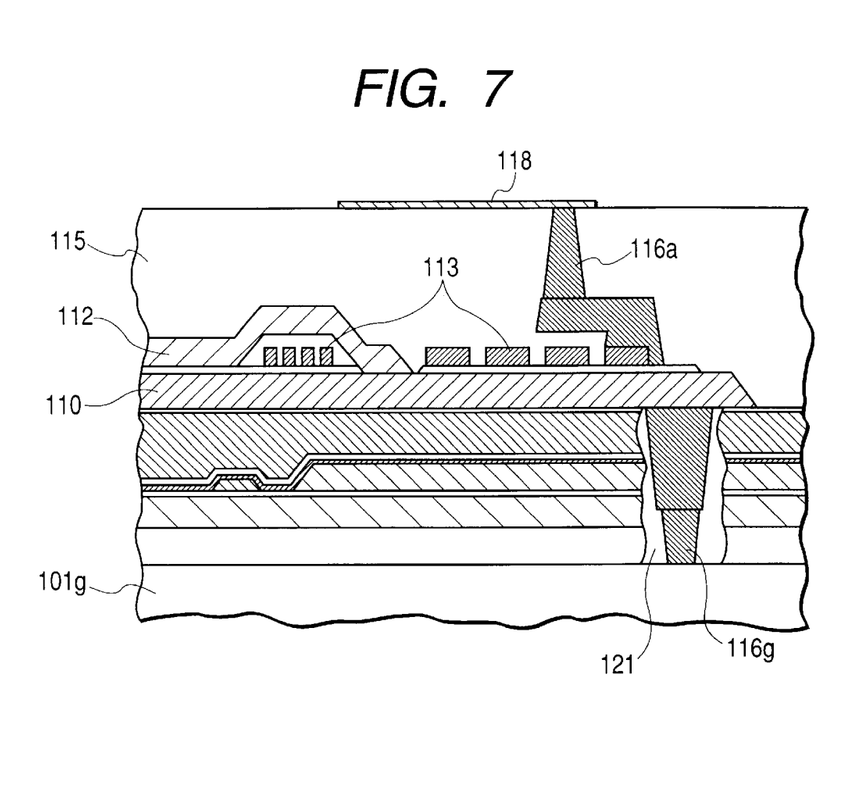
FIG. 7 is a cross-sectional view showing a third embodiment of the thin film magnetic head of the present invention.

FIG. 7 shows a third embodiment in which the lower magnetic pole and the substrate are brought into electrically conductive contact with each other without a separate conductor. With reference to FIG. 7, an inside metal layer 116g formed in electrically conductive contact with a substrate 101g is brought into electrically conductive contact with the lower magnetic pole 110. The inside metal layer 116g is covered with an internal metal insulating film 121 consisting of alumina or another applicable material, whereby electrical contact with reproducing magnetic elements is prevented. The substrate 101g uses a material selected from a group of conductive ceramics such as $Al_2O_3.TiC$, SiC, TiC, WC, and $B_4C$. This structure can provide the substrate 101g having the same characteristics as those of the conductor 200 shown in FIG. 1, more specifically, higher equilibrium electrode potential in an aqueous solution than that of the magnetic thin film, and larger area than the cross sectional area of the magnetic thin film on the air bearing surface exposing to the outside of the thin film magnetic head slider, so it can produce the same effect as in the embodiment shown in FIG. 1.

Figure 8:
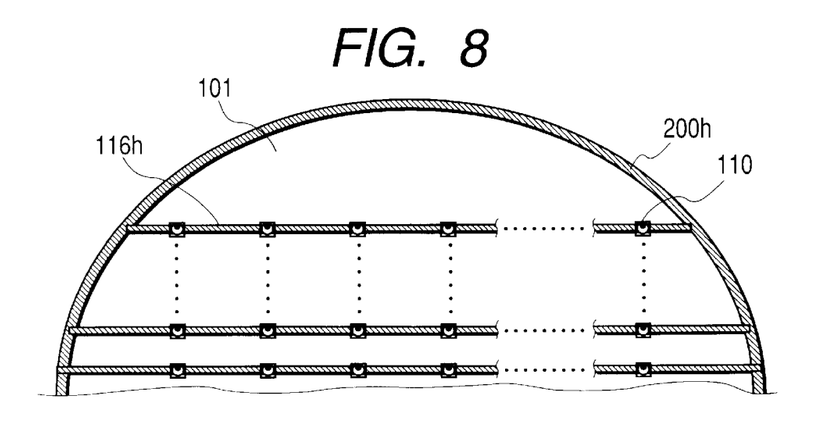
FIG. 8 is a plan view showing a fourth embodiment of the thin film magnetic head device according to the present invention.
Figure 9:
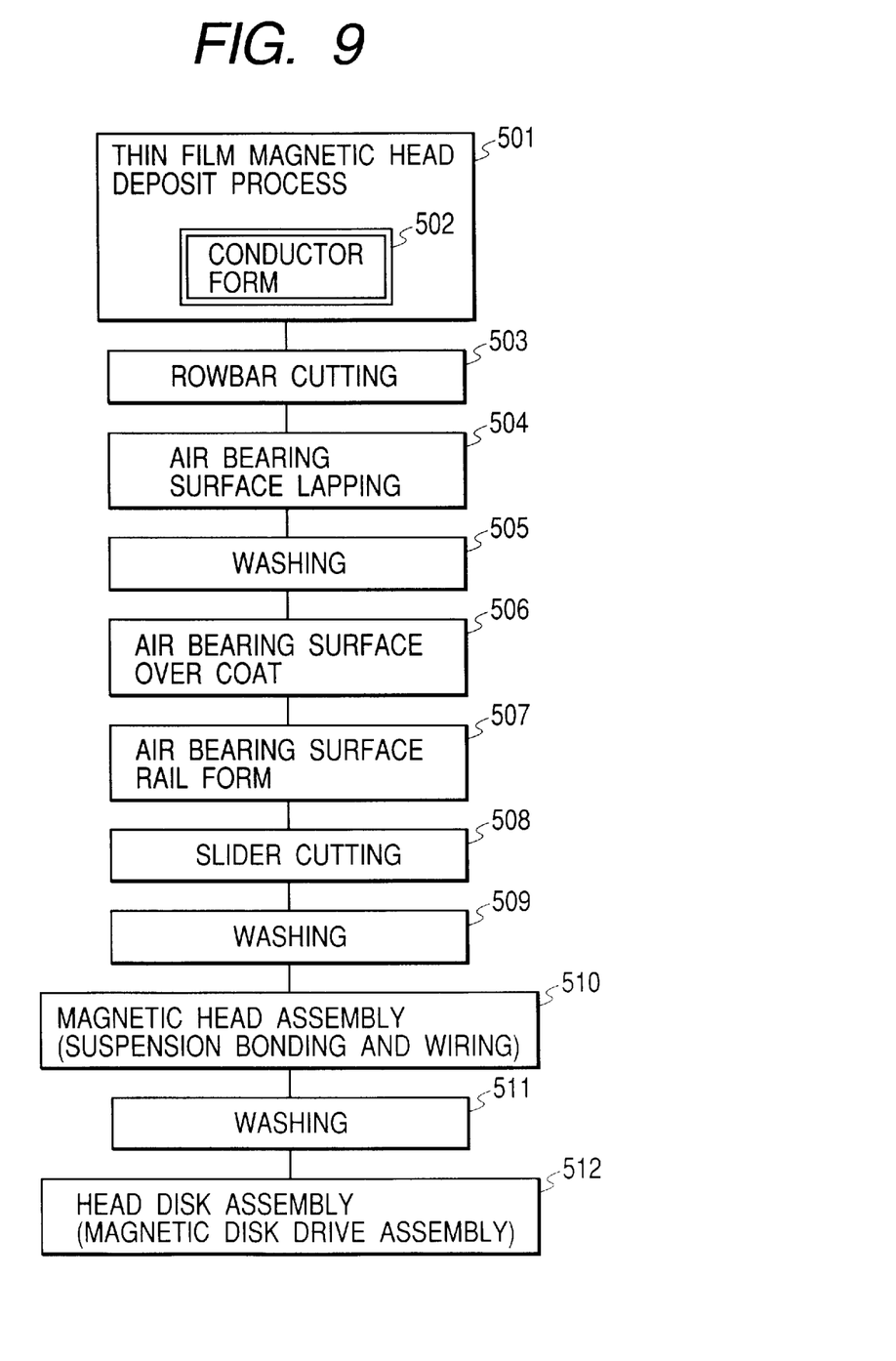
FIG. 9 is a flow diagram for illustrating a manufacturing process of the thin film magnetic head of the present invention.

FIG. 8 shows a fourth embodiment that retards corrosion of magnetic poles in an aqueous solution after their formation during the thin film magnetic head device forming process. With reference to FIG. 8, when the lower magnetic pole 110 is formed, an inside metal layer 116h and a conductor 200h are formed at the same time, in electrical continuity with each other. The conductor 200h is formed around the perimeter of the substrate 101, which is insensitive to the post processing. With this structure, at the time of growing a magnetic pole, resist is coated to forming a magnetic pole pattern, the magnetic pole is grown at a given position, and then it is necessary to strip the resist. In the resist stripping process, the washing process is performed by using a resist stripping fluid and by rinsing the resist stripping fluid out with pure water. At that time, the structure in FIG. 8 provides the conductor 200 with higher equilibrium electrode potential in the aqueous solution than that of the magnetic pole and larger area than that of the magnetic pole, and being exposed to the outer surface of the substrate 101, thereby making it possible to retard corrosion of the magnetic pole.

The effect produced when the conductor 200 is installed on a thin film magnetic head as shown in FIGS. 1 and 2 has been tested. The test was carried out in the washing step (step 505) after the air bearing surface lapping step (step 504), and in the washing step (step 509) after the slider cutting step (step 508) by measuring the tip recession (the amount of etching) from the substrate 101 caused by metal elution from the lower and upper magnetic poles 110 and 112 exposed to the air bearing surface 3 and corrosion occurrence ratios with and without the conductor 200. In the washing steps 505 and 509, ultra-sonic washing with a washing aqueous solution that is pure water containing a surfactant agent was carried out, then rinsing with pure water was carried out. The conductor 200 of a thin film magnetic head used in the test is consisting of Au; the inside metal layer 116c consisting of Cu formed to have electrical contact with the lower magnetic pole 110 is formed to have electrical contact with the conductor 200; the surface area of the conductor 200 is in a range from 5000 to 10000 times the cross sectional areas of the lower and upper magnetic poles 110 and 112 on the air bearing surface. The lower and upper magnetic poles 110 and 112 use a magnetic material containing a Co—Ni—Fe alloy to obtain higher magnetic flux density.

Specifically, the test was carried out for the washing step 505 by measuring the tip recession between the lower and upper magnetic poles 110 and 112 and the substrate 101 before and after the 10-, 20-, and 30-minute washing steps (step 505) of the thin film magnetic head in the washing aqueous solution heated to 40° C., and, for the washing step 509, by determining the corrosion occurrence ratios (%) of the lower and upper magnetic poles 110 and 112 under the same conditions, these rates being given by the following formula: number of corroded sliders÷number of sliders subject to washing process×100 (%). The test results in the case with the present invention that forms the conductor 200 and in the case with the prior art without the conductor 200 will be shown in FIGS. 10A and 10B respectively for washing after the air bearing surface lapping step and for washing after the slider cutting step. The horizontal axis of the graphs shown in FIGS. 10A and 10B indicates washing time; the vertical axis in FIG. 10A indicates the amount of tip recession between the lower and upper magnetic poles 110 and 112 after washing; the vertical axis in FIG. 10B indicates the corrosion occurrence ratios of the lower and upper magnetic poles 110 and 112 after washing.

Figure 10A:
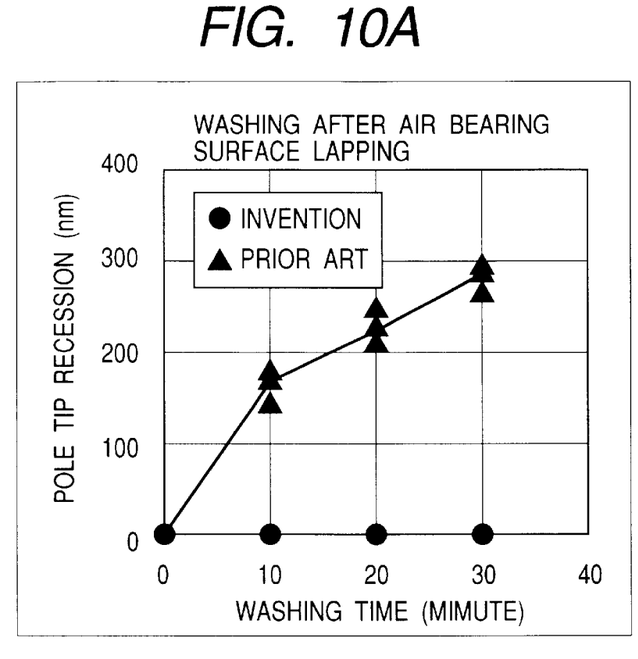
FIGS. 10A and 10B are graphical representations for illustrating the results of corrosion tests of a thin film magnetic head according to the present invention.
Figure 10B:
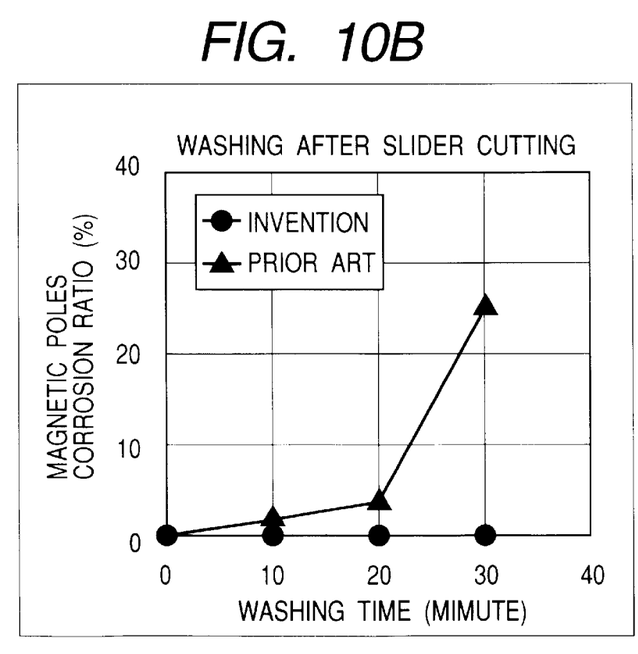

The test reveals that if the thin film magnetic head has a conductor 200 formed according to the present invention, the level difference between the lower and upper magnetic poles 110 and 112 and the substrate 101, as measured before and after the washing step 505, does not increase, and there is no increase in the corrosion occurrence ratios before and after the washing step 509 even if the washing time is lengthened. This demonstrates that providing continuity between the conductor 200 and the lower magnetic pole 110 brings the equilibrium electrode potential of the lower and upper magnetic poles in the washing agent closer to that of the conductor 200, thereby making it possible to retard corrosion. It is also clear from the results that in a prior art thin film magnetic head that does not have the conductor 200, each increase in the washing time in the washing step 505 introduces remarkable tip recession, and increases in the corrosion occurrence ratios after the washing step 509.

It was shown by the test described above that the present invention produces a corrosion retarding effect in the washing step 505 before the step of growing the over coat of air bearing surface 4, or the washing step in the state with the cross sections of the lower and upper magnetic poles 110 and 112 on the air bearing surface side being entirely exposed in the washing agent, and in the washing step 509 after the step of growing the over coat of air bearing surface 4, or the washing step in the state with the cross sections of the lower and upper magnetic poles 110 and 112 on the air bearing surface side being protected by the over coat of air bearing surface 4. The same result has been obtained for the washing step 511, which is not shown in the drawing, and it was demonstrated that the corrosion retarding effectiveness can be obtained in the thin film magnetic head manufacturing process before the thin film magnetic head is installed on the magnetic disk drive.

As described above, in the thin film magnetic head device forming process, forming the conductor 200 having larger surface area than the cross sectional area of the lower and upper magnetic poles 110 and 112 on the air bearing surface side by electrically coupling to the lower magnetic pole 110 through the inside metal layer 116c makes it possible to retard corrosion of the lower and upper magnetic poles 110 and 112 in the aqueous solution, if the aqueous solution containing a surfactant agent is used for the lapping agent in the air bearing surface lapping process and washing agent immediate thereafter. There may be partial exposure of the lower and upper magnetic poles 110 and 112 due to flaws caused by contact with the air bearing surface 3 and detachment of the over coat of air bearing surface 4 in the manufacturing process. The trend is for the thickness of the over coat of air bearing surface 4 to decrease as the magnetic recording density increases, so the film itself becomes likely to generate pin holes as the case may be, which can cause partial exposure of the lower and upper magnetic poles 110 and 112. In those cases, the present invention can prevent corrosion of the exposing part of the lower and upper magnetic poles 110 and 112 immersed in aqueous solutions in washing and other steps in the subsequent process.

A conductor 200 with a larger surface area can be formed by providing it on the element formed surface, providing a sufficient degree of effectiveness in bringing the equilibrium electrode potential of the lower and upper magnetic poles 110 and 112 in the aqueous solution closer to its equilibrium electrode potential in the aqueous solution. In addition, since in the thin film device forming process, the inside metal layer 116c and the lead-out wires for recording and reproducing 116a and 116b can be formed concurrently and the conductor 200 and the recording and reproducing relay terminals 118 and 119 can be formed concurrently, no extra manufacturing facility or manufacturing processes are needed, resulting in reduced price.

The present invention can prevent corrosion of thin film magnetic head recording devices not only in the manufacturing process but also after the manufacturing. It can also prevent thinning due to corrosion, enabling recording and reproducing with a high degree of efficiency without air bearing loss. In addition, it can prevent development of corrosion from corrosion vestiges over time, making it possible to provide higher-yield, higher-reliability, higher-density, smaller, and lower-cost thin film magnetic heads. Furthermore, by providing the thin film magnetic head according to the present invention in magnetic disk drive, excellent recording and reproducing qualities can be achieved.

What is claimed is:

1. A thin film magnetic head comprising a recording magnetic element formed by a magnetic thin film and a conductor formed so as to make electrically conductive contact with the recording magnetic element, the conductor having a higher equilibrium electrode potential than that of the recording magnetic element unit in an aqueous solution, and having a larger surface area than the cross-sectional area of the recording magnetic element on an air bearing surface facing a magnetic recording medium.

2. The thin film magnetic head of claim 1, wherein the equilibrium electrode potential of the conductor becomes passive state in the aqueous solution of the recording magnetic element unit.

3. The thin film magnetic head of claim 2, wherein the conductor contains a material selected from a group of metals such as Au, Ag, Pt, Ru, Rh, Pd, Os, and Ir, or a group of conductive ceramics such as $Al_2O_3.TiC$, SiC, TiC, WC, and $B_4C$.

4. A thin film magnetic head comprising a magneto-resistive effect-type reproducing magnetic element, a recording magnetic element formed by a magnetic thin film, and a conductor formed externally so as to make electrically conductive contact with the recording magnetic element; the conductor having a higher equilibrium electrode potential in an aqueous solution than that of the recording magnetic element unit and having a larger surface area than the cross-sectional area of the recording magnetic element on an air bearing surface facing a magnetic recording medium.

5. A thin film magnetic head slider comprising a substrate having an air bearing surface facing a magnetic recording medium, a magneto-resistive effect reproducing magnetic element formed by a magnetic thin film formed on the substrate, a metal film for electrically connecting the reproducing magnetic element to the outside, a recording magnetic element having a magnetic thin film that generates magnetic fields and a recording coil for carrying electric current, a metal film for electrically connecting the recording coil to the outside, and a conductor formed externally via a lead wire so as to make electrically conductive contact with the recording magnetic element; the conductor having a higher equilibrium electrode potential in an aqueous solution than that of the recording magnetic element unit and having a larger surface area than the cross-sectional area of the recording magnetic element on the air bearing surface facing the magnetic recording medium.

6. The thin film magnetic head slider of claim 5, wherein the conductor is formed so as to be exposed on the same surface of the plane having the metal film for electrically connecting the reproducing magnetic element to the outside and the metal film for electrically connecting the recording coil to the outside.

7. A thin film magnetic head slider comprising a substrate having an air bearing surface facing a magnetic recording medium, a magneto-resistive effect reproducing magnetic element formed by a magnetic thin film formed on the substrate, a metal film for electrically connecting the reproducing magnetic element to the outside, a recording magnetic element having a magnetic thin film that generates magnetic fields and a recording coil for carrying electric current, a metal film for electrically connecting the recording coil to the outside, wherein a lead wire is formed so as to provide electrical continuity between the recording magnetic element and the substrate, and the substrate having a higher equilibrium electrode potential than that of the recording magnetic element unit in an aqueous solution, and having a larger surface area than the cross-sectional area of the recording magnetic element on an air bearing surface facing a magnetic recording medium.

8. A method of producing a thin film magnetic head slider comprising a process of forming a recording and reproducing magnetic element including a magneto-resistive effect reproducing magnetic element formed by a magnetic thin film, a recording magnetic element that generates a magnetic field, and a recording coil for carrying electric current; a process of coating the recording and reproducing magnetic element with an insulating over coat; a process of forming metal films for electrically connecting the reproducing magnetic element and the recording coil via lead wires to the outside so as to expose to the outer surface of the insulating over coat; a process of forming a conductor exposed to the outer surface of the insulating over coat via a lead wire so as to make electrically conductive contact with the recording magnetic element; and a process of lapping and washing the air bearing surface facing a magnetic recording medium, wherein the conductor has a higher equilibrium electrode potential in an aqueous solution than that of the recording magnetic element unit and has a larger surface area than the cross-sectional area of the recording magnetic element on the air bearing surface facing the magnetic recording medium.

9. The method of producing a thin film magnetic head slider of claim 8, wherein the process of forming lead wires so as to have electrical continuity with the recording magnetic element and the process of forming a lead wire so as to make electrically conductive contact with each of the reproducing magnetic element and the recording coil are performed concurrently; the process of forming a conductor exposing to the outer surface of the insulating over coat via a lead wire in electrically conductive contact with the recording magnetic element and the process of forming the metal films so as to be exposed to the outer surface of the insulating over coat via lead wires in electrically conductive contact with the reproducing magnetic element and the recording coil respectively are performed concurrently.

* * * * *